UNITED STATES PATENT OFFICE 2,439,369

CONDENSATION DERIVATIVES OF RUBBER

William Howard Nicol, Cuyahoga Falls, Ohio, assignor to Wingfoot Corporation, Akron, Ohio, a corporation of Delaware No Drawing. Application November 15, 1943, Serial No. 510,383

3 Claims. (Cl. 260—768)

This invention relates to condensation derivatives of rubber. More particularly, it relates to a treatment of condensation derivatives of rubber whereby these materials acquire modified properties which markedly affect their utility as adhesives, molding and coating compositions, and for other purposes.

Rubber may be treated with a variety of reagents and in a variety of manners to produce what are commonly referred to as condensation derivatives. A wide variety of such derivatives is known and a number of them have been prepared commercially. Representative examples are the materials known as Pliolite (marketed by The Goodyear Tire & Rubber Company) and Thermoprene (marketed by the B. F. Goodrich Company). Such condensation derivatives of rubber have found particular utility as adhesives, paints, paper coatings, golf ball covers, molding resins, and for a number of other purposes. One object of the present invention is to modify the characteristics of such condensation derivatives of rubber and improve their properties for application to these and other purposes. Other objects and advantages will appear as the description proceeds.

According to the present invention, condensation derivatives of rubber are treated with organic diisocyanates. It is not known for certain whether a chemical reaction takes place between the condensation derivative and the diisocyanate or whether the results observed are due to some other cause, but the treatment results in an improved adhesive power and a decrease in the thermoplasticity of the condensation derivative and in other modified properties.

The modified materials are particularly useful as adhesives. Rayon or regenerated cellulose has been used on a substantial scale to form the carcass or reinforcing cord structure of automobile tires. One of the problems inherent in the adaptation of rayon to this purpose was to secure adequate adhesion between the rayon carcass and the rubber used therewith. Some form of adhesive has generally been found necessary in order to obtain a satisfactory bond. A condensation derivative of rubber, such as that obtained by treating rubber with chlorostannic acid, can be dissolved in an organic solvent and applied to rayon cord, which is dipped therein and then dried. Cords so treated, when cured into a mass of rubber, produce a bond greatly superior to that obtained with untreated rayon. However, if to the solution or cement of the condensation derivative of rubber is added a small amount of an organic diisocyanate, still further improvement in the bond between the rubber and the rayon is obtained. This improved adhesion is particularly noticeable at somewhat elevated temperatures, such as those encountered in high speed operation of heavy truck tires. This improved "hot adhesion" is accompanied by a decreased thermoplasticity of the condensation derivative of rubber and may be in part the result thereof. In turn, this decreased thermoplasticity may be the result of a sort of vulcanization or polymerization of the condensation derivative of rubber caused by the diisocyanate. However, the ultimate cause of the effects observed is not known for certain.

Various other condensation derivatives of rubber may be employed, such as those obtained by treating rubber with tin tetrachloride, boron fluoride, ferric chloride and other halides of amphoteric metals, with sulfonic and chlorsulfonic acids, with hydrofluoric acid, or with hydrogen halide while the rubber is dissolved in a phenol, etc.

Any organic diisocyanate may be employed, including both aliphatic and aromatic diisocyanates. Representative examples are methylene di(paraphenylene isocyanate), hexamethylene diisocyanate, paraphenylene diisocyanate, metaphenylene diisocyanate, the diphenylene diisocyanates, the toluylene diisocyanates, the dimethyl phenylene diisocyanates, the naphthylene diisocyanates, the diisocyanates of dioxane, ethylene di(oxytrimethylene isocyanate), and the diisocyanates of other glycol ethers, of dipropyl ethers, etc. Methylene di(paraphenylene isocyanate) is a preferred material. These and other diisocyanates may be prepared by passing hydrogen chloride through a solution of the corresponding diamine in an organic solvent, then passing phosgene into the suspension formed by stirring the precipitate of the amine hydrochloride in the solvent, and heating to the reflux temperature of the solvent.

The adhesives falling within the invention may be used in uniting a wide variety of materials, either to themselves or to each other, including rubber, various synthetic rubbers, paper, textiles, cork, cotton, Holland fabric, regenerated cellulose (such as rayon and Cellophane), cellulose derivatives (such as the acetate, nitrate and acetobutyrate), high molecular linear polyamids (such as Nylon, manufactured by E. I. du Pont de Nemours and Company), glass, metals (including steel, brass, copper, aluminum, tin, etc.), rubber hydrochloride, and various polymeric materials (such as polyvinyl alcohol, polyvinyl chloride, polyvinyl acetate, copolymers of vinyl chloride and vinylidine chloride, etc.).

In applying the invention to the adhesive field, the diisocyanate may be added directly to the solution of the condensation derivative of rubber, or the condensation derivative and the diisocyanate may be applied to one or both surfaces of the materials to be joined as separate solutions. If desired, various other modifying agents may also be added, such as plasticizers, diluents, fillers, reinforcing agents, age resisters, resins, dyes, etc.

The diisocyanates may also be added to solid condensation derivatives of rubber by milling the diisocyanate into the condensation derivative or by grinding the condensation derivative to relatively small particle size and coating the particles with the diisocyanate or by any other means. These treatments are particularly suitable for the preparation of molding material.

The amount of diisocyanate used may vary over a considerable range, depending in part upon the particular diisocyanate and condensation derivative, the use to which the product is to be put, the other compounding ingredients used, the properties desired in the product, etc. In many cases, and particularly when the material is to be used as an adhesive, the amount will be small, for example, 1-5% based on the weight of rubber condensation derivative. In other cases, for example in molding compositions, higher amounts will sometimes be used, for example, 10-40% based on the rubber condensation derivative.

The treated condensation derivatives may be employed as molding resins, paints, coating compositions, and for many other purposes.

The treated condensation derivatives may be heated to promote the action of the diisocyanate and, of course, this is normal treatment when the material is used for molding. Such heating may also be employed when the material is used for other purposes. For example, painted articles may be baked and laminated articles, the layers of which are joined with a bonding layer of condensation derivative and diisocyanate, may be warmed. However, the desired modification of the condensation derivative also takes place at room temperature, although more slowly.

This application is a continuation-in-part of my earlier co-pending application Serial Number 464,391, filed November 3, 1942, now abandoned.

I claim:

1. An adhesive which comprises a condensation derivative of rubber and a small amount of an organic diisocyanate.

2. As a new composition of matter, the product resulting from treating a condensation derivative of rubber with a small amount of an organic diisocyanate.

3. As a new composition of matter, the product resulting from treating a condensation derivative of rubber with about 10 to 40% of an organic diisocyanate based on the weight of the rubber derivative.

WILLIAM HOWARD NICOL.

REFERENCES CITED

The following references are of record in the file of this patent:

UNITED STATES PATENTS

| Number | Name | Date |
| --- | --- | --- |
| 2,277,083 | Dorough | Mar. 24, 1942 |
| 2,313,945 | Kellog et al. | Mar. 16, 1943 |
| 2,317,730 | Calvert | Apr. 27, 1943 |
| 2,388,656 | Lichty et al. | Mar. 6, 1945 |
| 2,415,839 | Neal et al. | Feb. 18, 1947 |